March 24, 1970     N. F. STELLMAN     3,502,959
ELECTRONIC LOGARITHM CONVERTER

Filed Jan. 29, 1968     2 Sheets-Sheet 1

INVENTOR.
NORMAN F. STELLMAN
BY
*Carl R. Brown*
ATTORNEY

March 24, 1970 N. F. STELLMAN 3,502,959
ELECTRONIC LOGARITHM CONVERTER
Filed Jan. 29, 1968 2 Sheets-Sheet 2
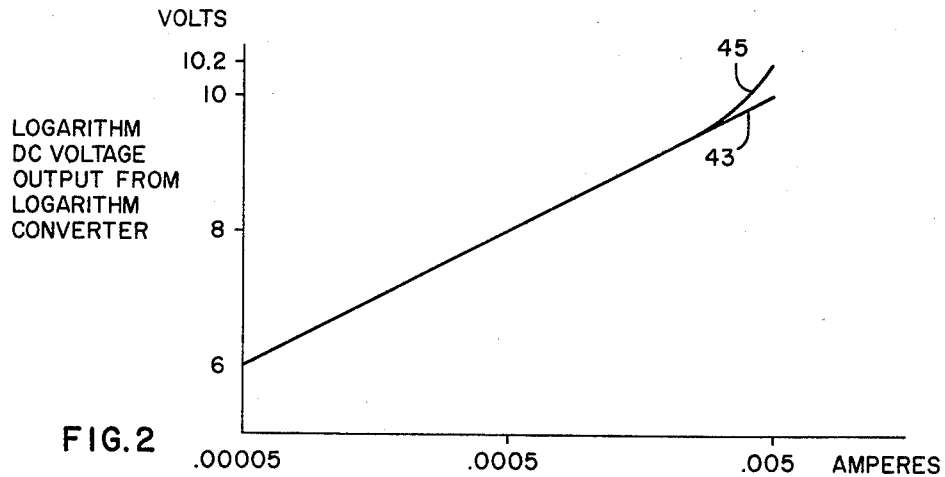
FIG. 2
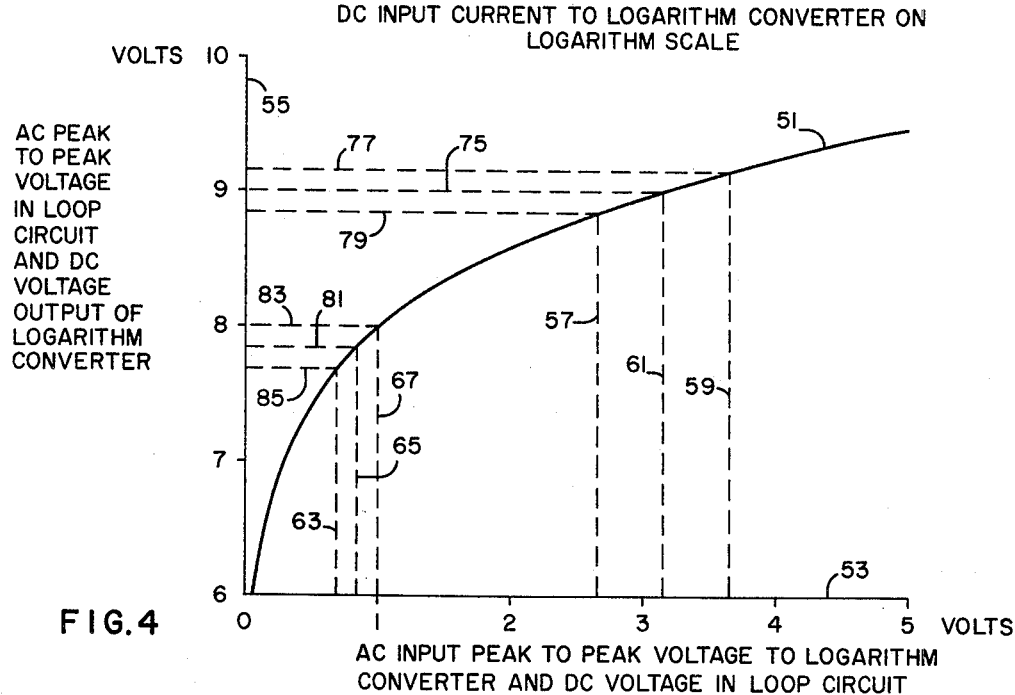
FIG. 4
| LOGARITHM DC VOLTAGE OUTPUT FROM LOGARITHM UNIT | LOGARITHM DC VOLTAGE OUTPUT FROM LOGARITHM CONVERTER |
|---|---|
| 7 | 7 |
| 8 | 8 |
| 9 | 9 |
| 10.2 | 10 |
FIG. 3
INVENTOR.
NORMAN F. STELLMAN
BY
*Carl R. Brown*
ATTORNEY United States Patent Office 3,502,959
Patented Mar. 24, 1970

3,502,959
ELECTRONIC LOGARITHM CONVERTER
Norman F. Stellman, San Diego, Calif., assignor to Spectral Dynamics Corporation, San Diego, Calif., a corporation of California
Filed Jan. 29, 1968, Ser. No. 701,331
Int. Cl. H02m 7/00; G06g 7/12, 7/24
U.S. Cl. 321—8                    17 Claims

ABSTRACT OF THE DISCLOSURE

An AC-DC logarithm converter having means for extending the DC operational range and in the AC mode employing a loop circuit that raises or lowers the amplitude of the AC input signal to a constant level, phase coherent signal in the loop and produces a DC signal in the loop having a magnitude on a logarithm scale that is proportional to the magnitude of the AC input signal.

BACKGROUND OF THE INVENTION

There are known AC-DC and DC logarithm converters for providing a DC voltage output that is the logarithm of an AC or DC input signal. However, these known logarithm converters have limitations in their dynamic operating ranges, require expensive and critical components, and are often limited in their overall use in performing different tasks. One known approach to an AC-DC logarithm converter is a DC logarithm converter device that utilizes a rectifier input for AC operation. This requires that the rectifier have a dynamic range equal to or better than the entire logarithm converter device. Another known logarithm converter has a servodriven logarithmically wound potentiometer inside a feedback loop for AC operation. For DC operation the incoming DC signal is chopped into an AC waveform. This system has marked disadvantages primarily in its mechanical portion including noise, poor reliability and the constant requirement of cleaning the slide wire.

Thus it is advantageous to have a new and improved AC-DC logarithm converter that satisfies many of the problems encountered in known devices and that has increased range, provides accurate outputs for very low frequency AC inputs, has rapid and constant time constants for circuit operation, has a rectifier portion that operates at true RMS at constant amplitude, and has a constant amplitude AC signal, with repeatable phase characteristics independent of input amplitude variations, that reduces to a minimum the required range of the circuit components and provides a constant amplitude, phase coherent signal that may be used in other analyzing circuits.

Summary of the invention

An exemplary embodiment of this invention generally comprises a DC logarithm conversion circuit and an AC to DC converting loop circuit, of which the DC logarithm conversion circuit is a part. The DC conversion circuit utilizes a known DC logarithm unit comprising an operational amplifier and diode connected in the feedback loop of the amplifier with the diode, as connected in the circuit, having a logarithmic impedance change or transfer function with changes in the amplitude of the DC current. This impedance or transfer function of the diode or a transistor connected as a diode is characterized by varying inversely with the DC current and thus decreasing with an increase in DC current amplitude. A linearizer circuit functions to extend the upper range of the DC logarithm unit for higher DC currents where an error component becomes significant because of the reduced magnitude of the impedance relative to the ohmic resistance of the diode.

In AC mode operation, the input AC voltage signal is amplified by the logarithm unit with an AC gain dependent upon the effective impedance of the diode. This impedance is dependent upon the magnitude of a control DC current generated in a loop circuit that flows through the impedance. Thus there is an established inverse relationship between the AC voltage gain in the logarithm unit and the magnitude of the control DC current. The loop circuit increases or decreases the input AC voltage signal to be converted to a logarithm output, to a given constant magnitude at a given point in the loop. Thus with an increase or decrease of the AC voltage, the control DC current is increased or decreased so that the control DC current is nulled to an amplitude that is directly proportional to the input AC voltage amplitude. This control DC current is processed by the DC logarithm unit and the linearizer circuit to provide a DC logarithm signal output that is directly proportional to the logarithm of the input AC signal.

It may thus be understood that the loop generated DC control current varies inversely with the AC gain of the DC logarithm unit, and since the DC control current is produced in the loop circuit as a result of the input AC signal, the loop circuit functions to pull the input AC signal to a given constant voltage magnitude while holding the same phase relationship. This makes it possible to process the AC signal by a rectifier, as for example, having only a limited dynamic range. Also this constant magnitude, phase coherent AC signal in the loop circuit may be tapped off for other uses, as for example in a phase comparison circuit where the phase of AC signals having widely different magnitudes are compared. Also a filter may be inserted in the path of the constant amplitude AC signal in the loop for removing unwanted frequencies and cleaning up the signal to produce the logarithm output of the amplitude of the fundamental frequency or band of frequencies of the AC input signal. This may be accomplished even in a noise generating environment. The filter is not required to have a large dynamic range in this application.

The loop circuit has other components for proportionalizing the DC control current with the AC input voltage to reach a null condition of a constant magnitude AC voltage. For example, the loop gain of the loop circuit is held constant for zero db to 80 db. Thus the time constants are the same. An adder circuit removes unwanted ramp voltages allowing faster response times and also cancels out ripple on the AC waveform in the loop.

It is therefore an object of this invention to provide a new and improved AC-DC electronic logarithm converter.

It is another object of this invention to provide a new and improved AC-DC electronic logarithm converter that utilizes solid state components, has a fast and constant response time and has an improved dynamic operating range.

It is another object of this invention to provide a new and improved AC-DC electronic logarithm converter having a loop circuit that nulls to an AC signal of constant magnitude, and which AC signal is phase coherent with the input AC signal.

It is another object of this invention to provide a new and improved AC-DC electronic logarithm converter that reduces an input AC signal to a constant amplitude in null condition in a manner that the AC signal processing components may have a limited operating range.

It is another object of this invention to provide a new and improved AC-DC electronic logarithm converter that is capable of providing the logarithm of the amplitude of the fundamental frequency of a complex AC signal, even in a noisy environment.

It is another object of this invention to provide a new and improved AC-DC electronic logarithm converter having a substantially constant and very rapid response time and that can accurately process input AC signals of very low frequency.

Other objects and advantages of this invention will be apparent from the following description taken in connection with the drawing in which like reference numbers designate like parts and in which:

FIGURE 2 is a graph on logarithm scale illustrating the relationship of a DC input current and the logarithm output voltage of the magnitude of the DC input current with an illustration of an error component that occurs at higher magnitudes of DC input current.

FIGURE 3 is an illustration of the scale relationship of the logarithm DC voltage output from the logarithm unit and the logarithm DC voltage output from the logarithm converter after being processed by the linearizer circuit.

FIGURE 4 is a graphic illustration of the AC input signal voltage to the electronic logarithm converter and the DC loop voltage relative to the logarithm of the DC loop voltage and the AC loop voltage.

Figure 1:
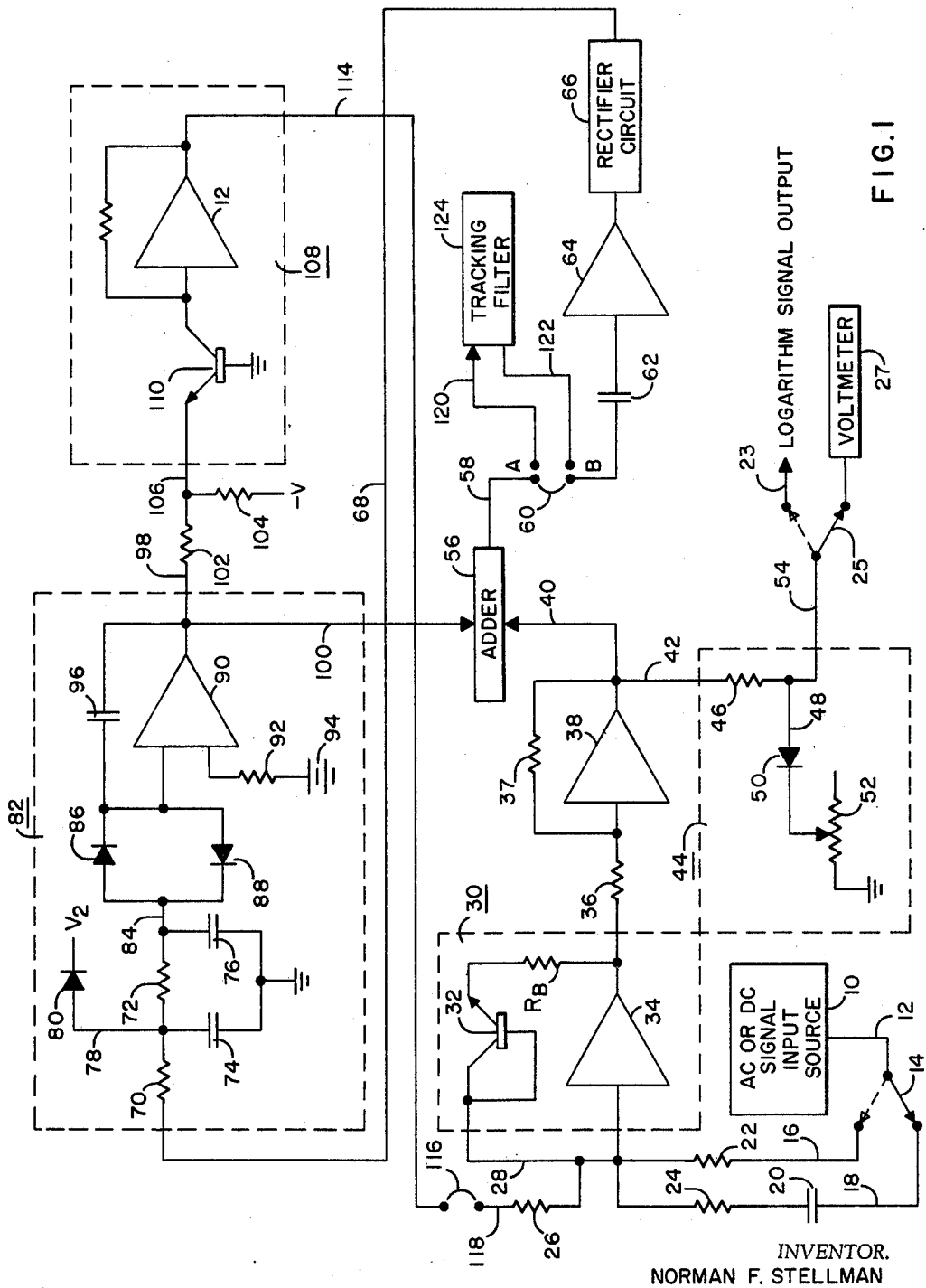
FIGURE 1 is a block diagram of an embodiment of the AC-DC electronic logarithm converter of this invention.

Referring to FIGURE 1, a source 10 of AC or DC signal inputs supplies either AC or DC voltage signals to line 12 and through switch 14 to the DC input line 16 or the AC input line 18.

DC mode

In the DC mode, switch 14 is switched to connect line 12 to line 16 and the DC signal input passes through resistor 22 to a DC logarithm unit 30 that comprises an operational amplifier circuit 34 and a transistor connected as a diode 32 that are connected in parallel. The diode 32 in the operational circuit has an impedance or transfer function Z. While a transistor connected as a diode is illustrated for use in this circuit, any diode having an impedance or transfer function Z that, in the operational circuit, varies inversely with the current magnitude passing therethrough on a logarithm scale, may be used. The resistance $R_B$ is the ohmic resistance of the diode 32 and does not vary with the current. The DC current flows through line 28, through the diode 32 and through resistor 36 to the amplifier 38.

The operational amplifier 34 does not pass the DC current and accordingly all the current passes through line 28 and through the diode 32. The high open loop gain of amplifier 34 functions to maintain the logarithm characteristic of the transfer function Z to a high degree of accuracy and also provides a low output impedance to which subsequent circuitry can be attached. Resistor 36 is a current resistor for amplifier 38 and resistor 37 is a normal parallel connected amplifier resistor. The amplification of amplifier 38 is set to provide amplification for the required characteristics of the circuit as will be more apparent hereinafter. The DC current passes through resistor 37 and passes through line 42 and through resistor 46 to the logarithm signal output in line 54.

In the use of amplifier 34 and the impedance of transfer function Z of the diode 32 as a logarithm unit for direct current signals, it is necessary that the impedance Z be larger relative to the ohmic resistance $R_B$ of the diode 32. Because the impedance Z varies inversely with the DC current magnitude, for large DC input currents the resistance and voltage drop through resistor $R_B$ becomes large relative to impedance Z. This causes a significant deviation from the logarithmic transfer curve when the DC input signal amplitude exceeds a given amount. Referring to FIGURE 2, there is illustrated by line 45 on a logarithm scale the graphic relationship between the DC voltage output from the logarithm unit 30 relative to the DC input current to the logarithm unit 30. The straight line 43 represents the desired linear relationship between the DC voltage output and the DC input current on the logarithmic scale. As may be seen for large currents, the error deviation caused by the ohmic resistance $R_B$ becomes large. For illustration purposes, when the output DC voltage approaches 10 volts, the error deviation of line 45 becomes significant. This error deviation caused by the ohmic resistance of the diode 32 has in the past required that the DC input current be reduced in magnitude to always keep the DC current on the linear portion of the logarithm scale. This is undesirable for several obvious reasons, such as the need for additional circuit components and the interpretations of the logarithm signal output. Thus a linearizer circuit 44 comprising resistor 46, diode 50, and potentiometer 52 is provided in the output line 42 and 54 to hold the logarithm output to a linear relationship for higher current amplitudes. For example, for an input of 5 milliamps DC current to the logarithm unit 30, the DC voltage logarithm output will be 10.2 volts rather than the accurate output of 10 volts. The .2 volt represents the error deviation portion resulting from ohmic resistance $R_B$. The linearizer circuit in this illustration employs the combination of the resistance 46, diode 50 and the setting of the potentiometer 52 to drain off to ground a portion of the output current, as for example a proportional amount of output current above 9 to 10 volts, wherein the output current in line 42 is reduced to the output voltage of 10 volts in line 54. Thus the logarithm voltage output as illustrated in FIGURE 3 is a correct linear logarithm output on the logarithm scale and thus higher amplitudes of DC current can be processed, thereby increasing the range of the entire electronic logarithm converter of this invention.

Operation in DC mode

In operation for converting a DC signal input to a DC logarithm signal output, a DC signal input is fed through line 12 and through switch 14 to line 16 and through resistor 22 to the logarithm unit 30. The direct current passes through line 28, through the diode 32 and the ohmic resistance $R_B$ and then through resistor 36 and the resistor 37 amplifier 38 combination, and through resistor 46 to the output 54. Potentiometer 52 is set to that current drain to ground of the output current in line 54 to give the correct logarithm voltage output at higher DC input voltages.

AC mode

In the AC mode, any AC input signal from any source, such as the AC signal input source 10, is supplied to line 12 and through switch 14 to AC input line 18. The capacitor 20 removes DC components in the AC signal. The AC signal is applied through resistor 24 to the DC logarithm unit 30 through line 28. A DC signal also feeds from line 118 through resistor 26 to line 28. This DC control signal, which is generated in a manner that will be described in more detail hereinafter, has an amplitude that is much larger than the amplitude of the AC input signal. The smaller AC signal is superimposed upon the DC control signal. The AC gain of the AC input signal through the logarithm unit 30 is dependent upon the effective magnitude of the impedance Z or the transfer function of diode 32, which is inversely proportional to the amplitude of the DC control signal current. Amplifier 38 amplifies the AC signal and feeds the AC signal through line 40 and through adder 56 to line 58. The DC control signal is processed by the logarithm unit 30 in the manner previously described and then passes out the output 54 as a DC logarithm signal output. As will be described hereinafter, the DC logarithm signal output for the DC control signal becomes the logarithm output for the in-input AC signal.

The loop or feedback circuit running from line 40 to line 118 generally functions to drive the AC input signal to a given constant amplitude while supplying a DC control signal with an amplitude that is proportional to the amplitude of the AC input signal. Thus the loop circuit is closed in AC mode by connecting jump connections 60 and 116 across the respective open circuits in lines 58 and 118. It should be understood that these jump connections may comprise any suitable low impedance connection or switch.

The feedback loop in driving the AC input signal to a given amplitude, holds this given amplitude in line 58 under null conditions to, for example, 125 millivolts peak to peak. Capacitor 62 functions to remove DC currents from the AC loop signal and amplifier 64 amplifies the AC loop signal. The rectifier circuit 66 rectifies the AC loop signal to a DC level in line 68. This rectifier circuit 66 may comprise any known rectifier circuit of the average, peak, or RMS type. It should be recognized that since the AC loop signal has a substantially constant amplitude at this point in the circuit, that the rectifier circuit 66 does not require a wide dynamic range. The DC level in line 68 is fed to an error integrator circuit 82 that comprises an amplifier 90 connected in parallel with capacitor 96, all of which is referenced to a stable voltage source 94 that may, for purposes of this explanation, be one volt DC. Thus the 125 millivolts, peak to peak, AC loop signal in line 58 is amplified through amplifier 64 and rectified by rectifier circuit 66 to, for example, provide a one volt DC level in line 68 when the AC feedback loop has achieved a stable or null condition. When the DC level in line 68 is above one volt DC, then the output voltage of the error integrator circuit 82 goes down in magnitude. When the DC level in line 68 is below one volt, then the output voltage of the error integrator circuit 82 in line 98 is increased. These increases or decreases in the DC level in line 68 are reflective of a change in the amplitude of the AC input signal and these increases and decreases occur to adjust the amplitude of the DC control signal in line 118 to return to the AC loop signal to the constant peak to peak value.

The output signal in line 98 is fed through the attenuating resistor bridge comprising resistors 102 and 104 and through line 106 to an anti-logarithm conversion unit 108. The antilogarithm conversion unit 108 is a known circuit comprising an amplifier 12 connected in series with a transistor 110, which combined circuit provides an antilogarithm output current signal through line 114, connecting jumper or switch 116 and through line 118 and resistor 26 to line 28 of the logarithm unit 30.

As previously stated, the impedance Z of diode 32 decreases with an increase in the amplitude of the current passing therethrough. Accordingly, as the current in line 118 is increased or decreased, the impedance Z of diode 32 is varied inversely and the AC gain of the AC signal by the logarithm unit 30 increases or reduces the amplitude of the AC signal applied to line 12 to a point that the AC signal stabilizes at a peak to peak amplitude at line 58 of 125 millivolts.

The purpose of the feedback loop in the AC mode is to maintain the AC peak to peak voltage in line 58 to a given amplitude for all amplitudes of the AC input signal. The DC control current in line 118 is caused to increase or decrease in amplitude in proportion to the amplitude of the AC input signal applied to line 12. Thus while the AC loop signal in line 58 is held by the feedback loop circuit to a given peak to peak amplitude, the DC control current in line 118 is increased or decreased in proportion to the AC signal input and this DC control current is processed by the logarithm unit 30 to provide an output in line 54, which is the DC logarithm signal output corresponding to the AC input signal. The graph in FIGURE 4 illustrates this relationship and has a logarithm curve 51 corresponding to the logarithm transfer function of the logarithm unit 30. The voltages used in the graph are representative only to illustrate the operation of the invention. The X coordinate line 53 in the graph represents the AC input voltage applied to line 12 that is combined with the DC control voltage corresponding to the DC current in line 118. Line 55 corresponds to the AC loop voltage and the DC voltage output of the logarithm unit 30. For example, where an AC input voltage has a peak to peak amplitude, represented by dotted lines 57 and 59, riding on DC control voltage 61, the DC control current decreases the AC gain of logarithm conversion unit 30 sufficiently to reduce the peak to peak voltage on the Y coordinate line 55 to the peak to peak amplitude represented by dotted lines 77 and 79. Should the input AC signal to line 12 have a lower magnitude, as for example, a peak to peak voltage corresponding to dotted lines 63 and 67, then the loop circuit will reduce the DC control voltage in line 118 to a magnitude that is represented by dotted line 65. When this reduced DC control current or voltage and AC input signal are processed by the logarithm unit 30, then the AC gain of the logarithm unit 30 increases. Accordingly the processed AC voltage has a peak to peak amplitude corresponding to dotted lines 83 and 85 for the DC voltage 81. It is to be noted that while the peak to peak voltages of lines 57 and 59 are larger than the peak to peak voltages of lines 63 and 67, the voltage outputs from the logarithm unit 30 provides output voltages corresponding to 77 and 79 and lines 83 and 85 which have equal peak to peak amplitudes. The different amplitude AC input voltages accordingly have been decreased to the same peak to peak amplitude by the DC control signal in line 118 and the logarithm unit 30.

In further describing the operation of the circuit in AC mode operation, there are several operational circuit relationships that increase the operational capability of the entire circuit. It is advantageous to make the response time of the error integrator circuit 82 as fast as possible However large changes in amplitude of the input AC signal cause corresponding large changes in the DC control current in line 118. This large change in DC control current can be amplified by amplifier 38 creating an unwanted ramp voltage in line 40 that causes error signals in the loop circuit. However, as previously described, to obtain the increase in the DC control current amplitude in line 118, the error integrator circuit 82 provides a corresponding decreasing DC current output to line 98. These increasing and decreasing ramp signals have the same magnitude. Thus by applying the ramp signal output of error integrator 82 through line 100 to adder 56, the ramp signal in line 40 is eliminated. This allows the time constant of the entire loop circuit to be optimized. Thus low frequency AC input signals may be processed by the electronic logarithm converter of this invention.

It is also advantageous to provide an electronic logarithm converter having a uniform as well as a fast response time. Referring to the error integrator circuit 82, it is well known that integrator circuits have a faster response time when the input voltage is say 10 db larger than the reference voltage of the integrator, than when the input voltage is say 10 db smaller than the reference voltage. This difference in integrator response time can be considerable. Accordingly the error integrator circuit 82 is provided with a clamp circuit that equalizes these response times. The error integrator circuit 82 is provided with a reference voltage $V_2$ that is applied through diode 80 and line 78 to the point between resistors 70 and 72. The reference voltage may have a voltage magnitude of for example 2 volts DC. This reference voltage coupled with diode 80 and resistor 70 forms a clamp circuit that clamps the input voltage change, up or down, to a uniform amplitude change. Thus the response time of the integrator is held substantially constant for any change in DC current in line 68. Resistance 72 and capacitors 74 and 76 function as a filtering circuit.

The error integrator circuit 82 may have to "hunt," where there are very small changes in the input DC current in line 68. Diodes 86 and 88 function to create a dead zone around the null point of the integrator and thus eliminate this "hunting." The RC time constant of the integrator is a multiplication of the time constants of the capacitor 96 times the resistances 70 and 72. At very low voltages, the resistance of diodes 86 and 88 approach infinity. Thus the RC time constant, with the addition of the near infinite resistances of diodes 86 and 88, becomes very large for low voltage changes and accordingly the integrator does not respond to noise or other spurious signals.

The entire loop circuit, as for example from line 28 to line 28, has that gain required to compensate for line and component losses as required to hold the 125 millivolts peak to peak amplitude for the AC loop signal in line 58. However, with changes in the amplitude of the AC input voltage in line 12, the loop circuit must compensate for this change in the manner previously described. Accordingly, the gain of the loop circuit under certain conditions, can be substantial. The time constant of the loop circuit is inversely proportional to the loop gain. Thus for large db changes the loop time constant can vary widely which is an undesirable condition. Accordingly it is advantageous to maintain the loop gain at a constant magnitude for wide db changes in the signal and further by maintaining the loop gain constant, the loop circuit does not provide large amplification to possible DC ripple currents that may be in the signal. The antilogarithm circuit 108 provides an output response that is the antilogarithm of the input signal, and thus functions to provide a constant gain for the entire loop circuit, regardless of wide db variations, and thus maintains the loop gain constant. The attenuating circuit, comprising resistors 102 and 104 connected to a negative voltage reference, further reduces the loop signal in connection with the antilogarithm circuit 108 to maintain the loop gain constant.

Operation in the AC mode

In operation in the AC mode, an AC signal input is applied to line 12 and through switch 14 to line 18, through DC blocking condenser 20 and through resistor 24 to line 28. The AC input signal is blocked by the operational amplifier 34 and thus passes through the resistor connected as a diode 32, through resistance $R_B$ and is amplified by amplifier 38. The amplified AC signal is applied to adder 56 where it passes through line 58, through jump connection 60, through the DC blocking capacitor 62 and is again amplified by amplifier 64. The amplified AC signal is then rectified to a DC level by rectifier circuit 66 and passes through line 68 to the error integrator circuit 82. As previously stated, the loop circuit holds the AC signal in line 58 to a magnitude of 125 millivolts peak to peak. This 125 millivolt amplitude, as amplified by amplifier 64, has a magnitude of one volt DC at resistor 70 in line 68. If the AC input signal to line 12 has a larger corresponding amplitude, then the voltage at resistor 70 is greater than one volt DC. This one volt signal is processed by the error integrator circuit 82 against its one volt reference voltage providing a downwardly directed DC voltage output to line 98. The decreasing DC signal in line 98 passes through the attenuating circuit comprising resistors 102 and 104 and is applied to the antilogarithm circuit 108. The antilogarithm circuit 108 amplifies the DC signal in a manner that holds the loop gain of the entire loop circuit to a given amount for wide db variations, and assures a uniform time constant for the entire loop circuit in the manner previously described. The DC signal is then fed through line 114, through jump connection 116 to line 118. If as stated, the AC input signal has an amplitude that is greater, when fed to line 58, than 125 millivolts peak to peak, then the DC signal in line 118 has an increased amplitude that when fed through resistor 26 and line 28 flows through the transistor connected as a diode 32 and accordingly decreases the impedance of the diode 32. Since the AC input signal also passes through diode 32, this decreased impedance Z reduces the AC gain of the AC signal and reduces its amplitude to a peak to peak voltage in line 58 of 125 millivolts. Since the DC control current in line 118 is increased by the loop circuit to an amplitude sufficient to decrease the impedance Z of diode 32 sufficiently to reduce the input AC signal, regardless of its input amplitude, to the 125 millivolt magnitude, the amplitude of the DC control current is made to be proportional to the amplitude of the AC input signal. The decreasing output voltage from the error integrator 82 is applied through line 100 to adder 56 where it is added with the output ramp voltage of amplifier 38 resulting from the change in DC control current, thus cancelling the ramp voltages. When this steady state condition is reached, then the DC current in line 42 is processed through the linearizer circuit 44 in the manner previously described to provide a DC logarithm signal output in line 54 that is proportional to the AC input signal.

The DC logarithm signal output, either in the DC mode or in the AC mode, may be selectively switched by switch 25 to a voltmeter 27 to provide a direct display reading or to line 23 for processing by other output circuitry.

AC mode of operation with tracking filter

While the circuit operation as previously described removes noise and other spurious signals from the AC signal that is processed by the loop circuit, it is sometime advantageous in particular environments or in particular uses of the electric logarithm converter to remove, as much as possible, extraneous signals in the input AC signal. In some applications the AC signal may have harmonics, or like unwanted frequencies, and it is desirable to obtain the logarithm of the fundamental frequency. In these uses of the invention, a filter such as tracking filter 124 is connected through lines 120 and 122 to points A and B of line 58. Thus the AC signal is passed through the tracking filter 124 where unwanted frequencies in the AC signal are removed. It should be understood that while any suitable filter 124, such as a low pass filter or high pass filter, may be used to obtain a frequency band of interest with coherent amplitude and phase, it is particularly advantageous to employ a filter whose frequency band is selectively variable. Such filters as tracking filters that track a given fundamental frequency, or constant percentage or third octave filters or other suitable filters that sweep with a constant frequency band width, allow logarithm output analysis for given frequencies in a complex input signal or for an input signal having a variable frequency. A tracking filter that may be used in this invention is that tracking filter illustrated in U.S. Patent No. 3,018,439.

It is understood that minor variations from the form of the invention disclosed herein may be made without departure from the spirit and scope of the invention and that the specification and drawings are to be considered as merely illustrative rather than limiting.

Having disclosed my invention, I now claim:

1. An electronic logarithm converter for providing a logarithm signal output for an input signal comprising,
   logarithm unit means responsive to an input signal for providing a logarithm signal output for the input signal,
   means for reducing the magnitude of said output signal in an amount proportional to the magnitude of said output signal above a given magnitude of said output signal to hold said logarithm signal output to a substantially logarithm relationship with said input signal for higher magnitudes of said input signal, and
   said means being electrically external to said logarithm means.

2. An electronic logarithm converter as defined in claim 1 in which,
   said input signal is a DC signal and said signal output is a DC signal,
   said logarithm means comprises amplifier means having a feedback loop,
   solid state diode means connected in said feedback loop, and
   said diode means having a logarithm transfer function.

3. An electronic logarithm converter as defined in claim 2 in which,
   said logarithm unit means having a logarithm transfer function between given magnitude limits of current inputs and having an error component for current inputs above said limits, and
   said means comprises a diode and potentiometer circuit connected in series between the output of said logarithm unit means and ground potential with said potentiometer being capable of adjusting said circuit to drain off to said ground potential, current having a magnitude that is substantially equivalent to said error component.

4. An electronic logarithm converter for providing a logarithm signal output for an input signal comprising,
   logarithm unit means responsive to an input signal for providing a logarithm signal output for the input signal,
   linearizer means for reducing the magnitude of said output signal in an amount proportional to the magnitude of said output signal above a given magnitude of said output signal to hold said logarithm signal output to a substantially logarithm relationship with said input signal for higher magnitudes of said input signal,
   said input signal is a DC signal and said signal output is a DC signal,
   said logarithm unit means comprises amplifier means having a feedback loop,
   solid state diode means connected in said feedback loop,
   said diode means having a logarithm transfer function,
   said logarithm unit means having a logarithm transfer function between given magnitude limits of current inputs and having an error component for current inputs above said limits, and
   said means comprises a diode and potentiometer circuit connected in series between the output of said logarithm unit means and ground potential with said potentiometer being capable of adjusting said circuit to drain off to said ground potential, current having a magnitude that is substantially equivalent to said error component.

5. An electronic logarithm converter for providing a logarithm signal output for an input signal comprising,
   circuit means for receiving an AC input signal and driving the input magnitude of the AC input signal to a given constant magnitude providing a DC control signal proportional to the input magnitude of the AC input signal, and
   said circuit means including logarithm unit means responsive to said DC control signal for providing a logarithm signal output proportional to the initial magnitude of the AC input signal.

6. An electronic logarithm converter as claimed in claim 5 in which,
   said circuit means comprises a loop circuit wherein said AC input signal is superimposed upon said DC control signal to form a composite signal at the input to said logarithm unit means, and
   said logarithm unit means being responsive to said composite signal to provide an AC output having an AC gain that varies inversely with the magnitude of said DC control signal.

7. An electronic logarithm converter as claimed in claim 6 in which,
   said loop circuit having first means for sensing the magnitude difference between said AC output and said given constant magnitude for increasing or decreasing the magnitude of said DC control signal in proportion to said difference.

8. An electronic logarithm converter as claimed in claim 7 in which,
   said loop circuit having antilogarithm unit means for providing a substantially constant gain and response time in said loop circuit.

9. An electronic logarithm converter as claimed in claim 7 in which,
   said first means providing a DC control signal output, and
   said loop circuit having antilogarithm unit means responsive to said DC control signal output for providing a DC antilogarithm output.

10. An electronic logarithm converter as claimed in claim 9 in which,
    said antilogarithm DC output being said DC control signal.

11. An electronic logarithm converter as claimed in claim 7 in which,
    said first means having rectifier means for rectifying said AC output to a DC level, and
    integrator means having a given null voltage and being responsive to said DC level for providing an output DC ramp signal proportional to the difference between said DC level and said null voltage.

12. An electronic logarithm converter as claimed in claim 11 in which,
    said integrator means having clamp circuit means for providing substantially equal response times for DC levels having magnitudes above and below said null voltage.

13. An electronic logarithm converter as claimed in claim 11 in which,
    the input of said integrator means having diodes connected oppositely in respective parallel connected lines for making said integrator means non-responsive to small differences between said DC level and said null voltage.

14. An electronic logarithm converter as claimed in claim 11 in which,
    said loop circuit having amplifier means responsive to the output of said logarithm unit means for providing an amplified output of said AC output and ramp signal in response to rapid changes in said DC control signal, and
    added circuit means for adding the output of said amplifier means and a portion of the ramp signal from said integrator means, thereby cancelling out said ramp signal.

15. An electronic converter as claimed in claim 7 in which,
    said loop circuit having filter means for filtering said AC output supplied to said first means.

16. An electronic converter as claimed in claim 15 in which,
    said filter means comprising tracking filter means for tracking a given frequency with a substantially narrow frequency pass band.

17. An electronic converter as claimed in claim 15 in which,
said filter means comprising a filter having means for selectively filtering a given frequency band width over a given range of frequencies.

References Cited

UNITED STATES PATENTS

| | | | |
|---|---|---|---|
| 2,877,348 | 3/1959 | Wade et al. | 328—145 |
| 3,108,197 | 10/1963 | Levin | 307—229 |
| 3,111,627 | 11/1963 | Praglin | 328—145 |
| 3,234,404 | 2/1966 | Peters | 328—145 XR |
| 3,252,007 | 5/1966 | Saari | 328—145 XR |
| 3,330,966 | 7/1967 | Klipsch | 38—145 XR |
| 3,417,263 | 12/1968 | Thomas | 307—229 |

WILLIAM M. SHOOP, JR., Primary Examiner

U.S. Cl. X.R.

307—229; 328—145